(12) United States Patent
Tojo et al.

(10) Patent No.: US 11,151,373 B2
(45) Date of Patent: Oct. 19, 2021

(54) INFORMATION PROCESSING APPARATUS AND INFORMATION PROCESSING METHOD

(71) Applicants: Yoshiharu Tojo, Kanagawa (JP);
Toshifumi Yamaai, Kanagawa (JP);
Koji Ishikura, Kanagawa (JP);
Fumihiro Teshima, Chiba (JP)

(72) Inventors: Yoshiharu Tojo, Kanagawa (JP);
Toshifumi Yamaai, Kanagawa (JP);
Koji Ishikura, Kanagawa (JP);
Fumihiro Teshima, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 51 days.

(21) Appl. No.: 16/503,794

(22) Filed: Jul. 5, 2019

(65) Prior Publication Data

US 2020/0026915 A1    Jan. 23, 2020

(30) Foreign Application Priority Data

Jul. 20, 2018  (JP) .............................. JP2018-137252
Jun. 6, 2019   (JP) .............................. JP2019-105969

(51) Int. Cl.
*G06K 9/00* (2006.01)
*G06K 9/34* (2006.01)

(52) U.S. Cl.
CPC ..... *G06K 9/00469* (2013.01); *G06K 9/00463* (2013.01); *G06K 9/344* (2013.01); *G06K 2209/01* (2013.01)

(58) Field of Classification Search
CPC .............. G06K 9/00469; G06K 9/344; G06K 9/00463; G06K 2209/01; G06K 9/00442

USPC ......................................................... 382/229
See application file for complete search history.

(56) References Cited

U.S. PATENT DOCUMENTS

| | | |
|---|---|---|
| 2002/0025072 A1 | 2/2002 | Yamaai |
| 2003/0174904 A1 | 9/2003 | Yamaai |
| 2007/0217710 A1 | 9/2007 | Yamaai |
| 2008/0069473 A1 | 3/2008 | Tojo |
| 2011/0222776 A1 | 9/2011 | Jiang et al. |
| 2015/0187022 A1* | 7/2015 | Takahashi ............ G06Q 40/12 705/30 |

(Continued)

FOREIGN PATENT DOCUMENTS

| | | |
|---|---|---|
| JP | 2012-190434 | 10/2012 |
| JP | 2016-051339 | 4/2016 |

*Primary Examiner* — Amandeep Saini
(74) *Attorney, Agent, or Firm* — IPUSA, PLLC

(57) ABSTRACT

An information processing apparatus includes processing circuitry. The circuitry acquires first ledger sheet definition information and second ledger sheet definition information from a memory. The first ledger sheet definition information defines relative positions of an item and a value of the item in a ledger sheet. The second ledger sheet definition information defines relative positions of an item and a value of the item in a ledger sheet unique to a user. Based on at least one of the first ledger sheet definition information and the second ledger sheet definition information, the circuitry extracts an item and a value of the item from reading result information that associates a character string read from a ledger sheet image with information representing a position of the character string, and the circuitry outputs the extracted item and value of the item as a recognition result.

6 Claims, 16 Drawing Sheets

(56) References Cited

U.S. PATENT DOCUMENTS

2017/0301047 A1* 10/2017 Brown .............. G06Q 20/3827

* cited by examiner

FIG. 3

| DEFINITION ID | DEFINITION TYPE | DOCUMENT TYPE | IDENTIFICATION CHARACTER STRING |
|---|---|---|---|
| H01 | GENERAL-PURPOSE DEFINITION INFORMATION | GENERAL INVOICE SHEET | INVOICE, INVOICE SHEET |
| H02 | GENERAL-PURPOSE DEFINITION INFORMATION | QUOTATION SHEET | QUOTATION, QUOTING, QUOTE |
| H03 | GENERAL-PURPOSE DEFINITION INFORMATION | ORDER SHEET | ORDER, ORDERING, ORDER SHEET |
| S01 | SPECIFIC DEFINITION INFORMATION | CORPORATION U | UNIMAT XXX |
| S02 | SPECIFIC DEFINITION INFORMATION | SLIP SHEET FOR CORPORATION S | SA XXX |
| A01 | INDIVIDUAL COMPANY DEFINITION INFORMATION | INVOICE SHEET FOR CORPORATION R | CORPORATION R + INVOICE |
| A02 | INDIVIDUAL COMPANY DEFINITION INFORMATION | ... | ... |
| B01 | INDIVIDUAL COMPANY DEFINITION INFORMATION | QUOTATION SHEET FOR CORPORATION T | CORPORATION T + QUOTATION |

FIG. 4

LEDGER SHEET DEFINITION DB
- GENERAL-PURPOSE DEFINITION INFORMATION
- INDIVIDUAL COMPANY DEFINITION INFORMATION
- SPECIFIC DEFINITION INFORMATION

| DEFINITION ID = H01 (INVOICE SHEET) | | | | |
|---|---|---|---|---|
| ITEM ID | ITEM NAME | DIREC-TION | DISTANCE (RIGHT) | DISTANCE (LEFT) |
| 1 | | | | |
| 2 | TOTAL SUM | RD | | |
| 3 | SUBTOTAL | R | | |
| 4 | INVOICE NUMBER:; INVOICE NO. | R | | |
| 5 | | | | |
| 6 | CODE; ARTICLE CODE; PRODUCT NUMBER | D | | |
| 7 | ITEM NAME; ARTICLE NAME; PRODUCT NAME | D | | |
| 8 | QUANTITY | D | | |
| 9 | AMOUNT | D | | |
| 10 | UNIT PRICE | D | | |
| 11 | PRICE; PRICE (TAX EXCLUDED) | D | | |
| 12 | PAYEE ACCOUNT; BANK NAME:; BANK NAME, BANK NAME, BANK NAME: | R | | |
| 13 | BRANCH NAME, BRANCH NAME, BRANCH NAME, BRANCH NAME, BRANCH NAME: | R | | |
| 14 | ACCOUNT; ACCOUNT TYPE | R | | |
| 15 | ACCOUNT NUMBER; ACCOUNT NO. | R | | |
| 16 | NAME ON ACCOUNT | R | | |
| 17 | PAYMENT DUE DATE | R | | |

FIG. 6

| DEFINITION ID = A01 (INVOICE SHEET FOR CORPORATION R), USER ID = A | | | | | |
|---|---|---|---|---|---|
| ITEM ID | ITEM NAME | DIREC-TION | DISTANCE (RIGHT) | DISTANCE (LEFT) | |
| 2 | TOTAL | RD | | | |
| 3 | SUBTOTAL | R | | | |
| 11 | PRICE; PRICE (TAX EXCLUDED) | D | | | |
| 17 | PAYMENT DUE DATE | R | | | |
| ... | | | | | |

DEFINITION ID = S01 (SLIP SHEET FOR CORPORATION S)

| ITEM ID | ITEM NAME | DIREC-TION | DISTANCE (RIGHT) | DISTANCE (LEFT) | | | | | | | |
|---|---|---|---|---|---|---|---|---|---|---|---|
| 2 | TOTAL SUM | RD | | | | | | | | | ... |
| 3 | SUBTOTAL | R | | | | | | | | | |
| 4 | INVOICE NUMBER; INVOICE NO. | R | | | | | | | | | |
| 6 | CODE; ARTICLE CODE; PRODUCT NUMBER | D | | | | | | | | | |
| 7 | ITEM NAME; ARTICLE NAME; PRODUCT NAME | D | | | | | | | | | |
| 8 | QUANTITY | D | | | | | | | | | |
| 9 | AMOUNT | D | | | | | | | | | |
| 10 | UNIT PRICE | D | | | | | | | | | |
| 11 | PRICE; PRICE (TAX EXCLUDED) | D | | | | | | | | | |
| 17 | PAYMENT DUE DATE | R | | | | | | | | | |

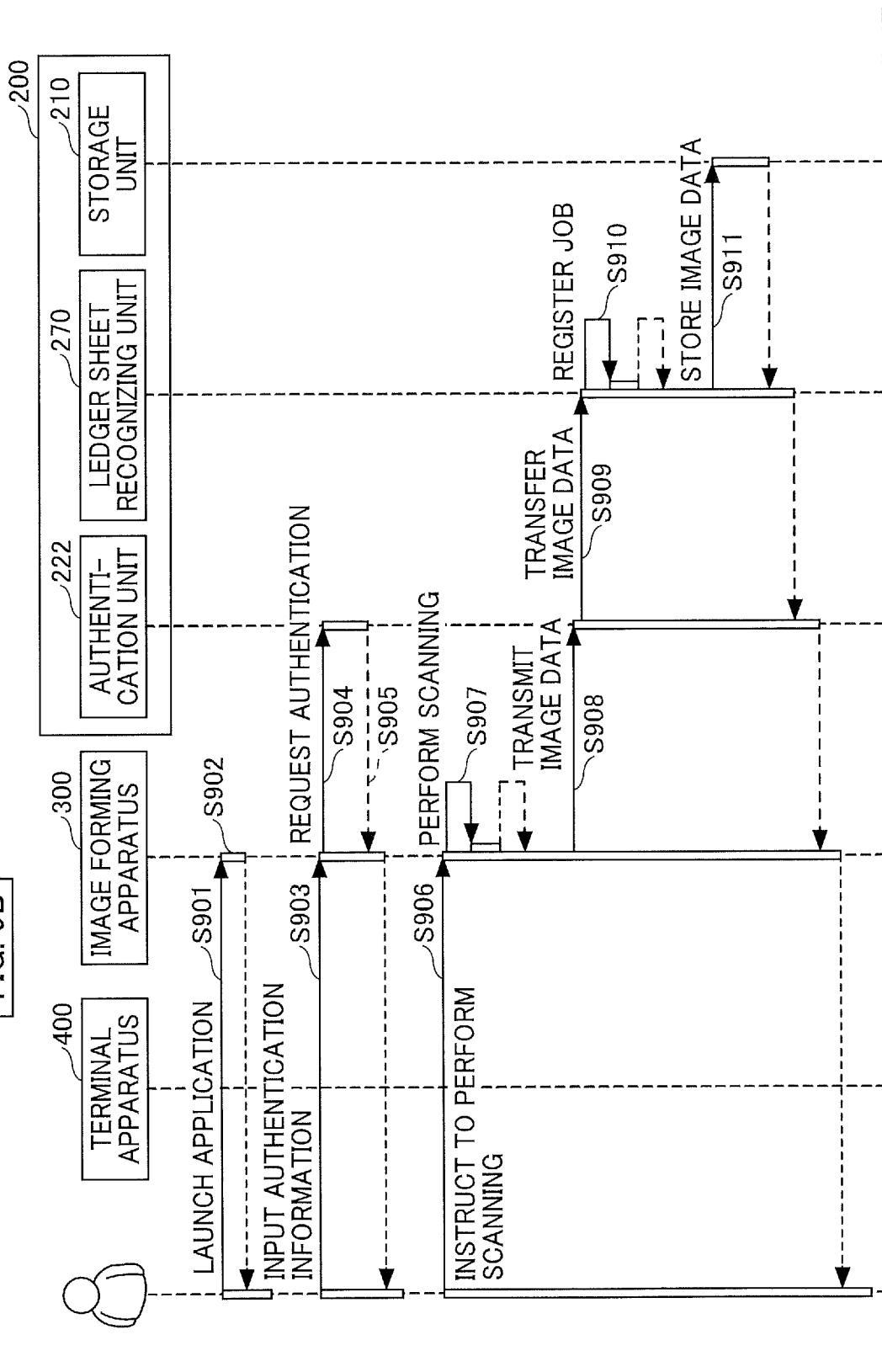

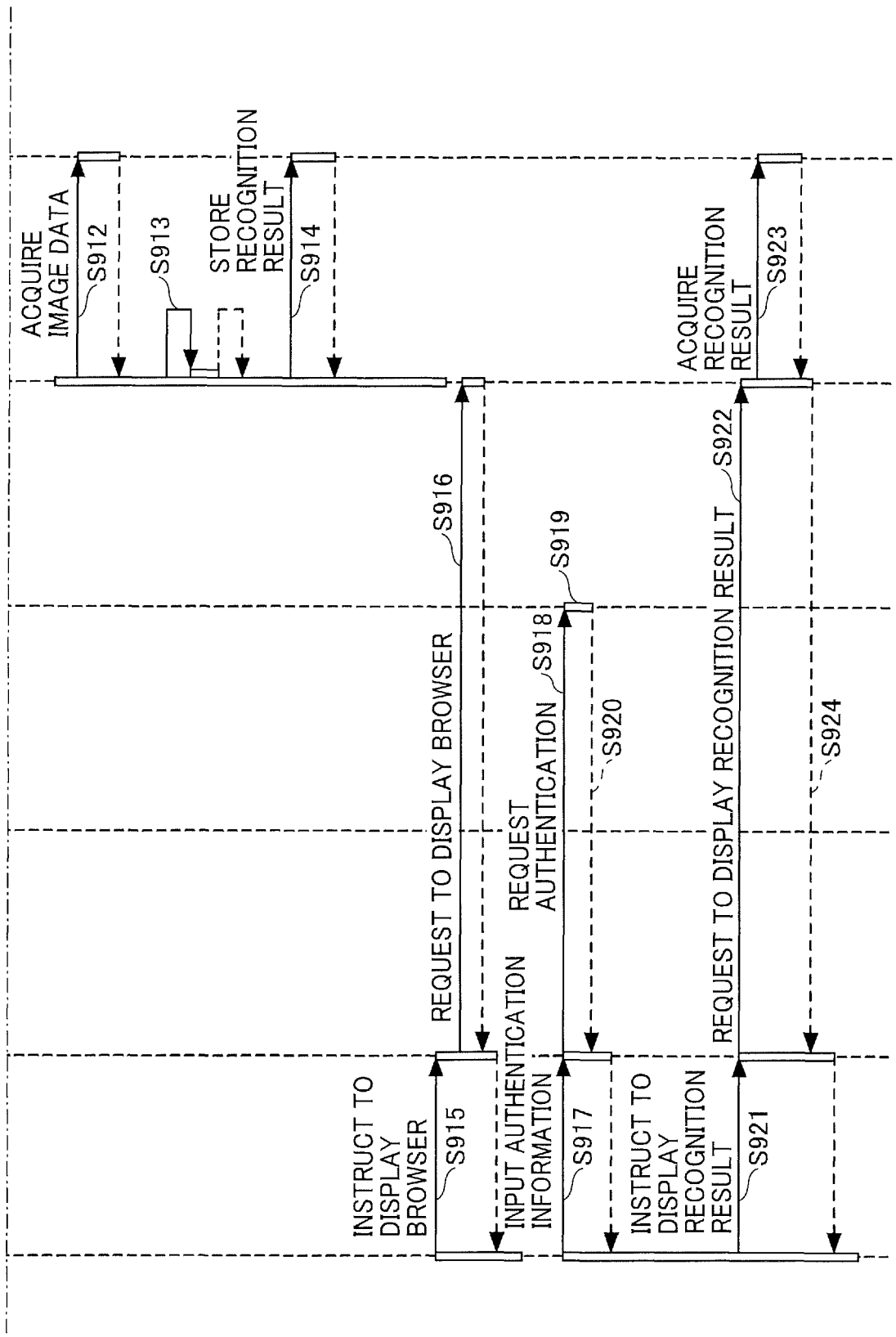

FIG. 10

| JOB ID | USER ID | LEDGER SHEET IMAGE FILE PATH | RECOGNITION RESULT FILE PATH | STATUS | DEFINITION ID |
|---|---|---|---|---|---|
| J1 | A123 | XXX | YYYY | COMPLETED | H01, A01 |
| J2 | B111 | XXY | ... | ... | S01 |
| ... | ... | ... | ... | ... | ... |

101

| ID | COORDINATE X | COORDINATE Y | CHARACTER STRING WIDTH | CHARACTER STRING HEIGHT | CHARACTER STRING |
|---|---|---|---|---|---|
| 19 | 780 | 546 | 150 | 56 | 請求書 — 1301 |
| 80 | 1384 | 600 | 475 | 49 | R社 — 1302 |
| 81 | 902 | 1716 | 48 | 46 | 計 — 1303 |
| | 1854 | 1719 | 136 | 45 | 12,960 — 1304 |

EXTRACTED BASED ON "GENERAL INVOICE SHEET" AND "INVOICE SHEET FOR CORPORATION R" — 144

INVOICE SHEET — 141

DATE OF ISSUE: MAY 29, 2017
DATE OF INVOICE: MAY 29, 2017

HIGASHI-SHINAGAWA XXX,
SHINAGAWA-KU, TOKYO

CORPORATION R
XXX BUILDING, AKASAKA,
MINATO-KU, TOKYO

TEL 03-XXXX-XXXX
SAMPLE LTD.
ATTN: XXX, SECTION 1,
FIRST SALES DEPARTMENT

PROCUREMENT DEPARTMENT
SECTION
HARDWARE PROCUREMENT
TEL.: 03-xxxx-xxxx xxxxxxxxxx   xxxxxxxxxx
xxxxxxxxxx
xxxxxxxxxx DESIGNATED ACCOUNT:
xxxxxx xxxxxx

| INVOICE NUMBER | MODEL NUMBER | TRANSFER NUMBER |
|---|---|---|
| A1238E4 | Y-AB-32456 | 100P1E |

ITEM NAME
72-INCH TV

DESCRIPTION

| QUANTITY OF ORDER | UNIT PACKAGE | CURRENCY | UNIT PRICE | TOTAL |
|---|---|---|---|---|
| 1 | | DOLLAR | 12,960 | 12,960 |

DELIVERY DATE
2017/05/16

DELIVERY ADDRESS

INVOICE INFORMATION — 142

| INVOICE ISSUER | CORPORATION R |
|---|---|
| BILLING AMOUNT | 12,960 |
| BILLING AMOUNT (TAX EXCLUDED) | N/A |
| INVOICE NUMBER | A123BF4 |
| DATE OF INVOICE | MAY 29, 2017 |
| CARRYOVER FROM PREVIOUS MONTH | XXXXX |
| SALES OF CURRENT MONTH | XXXXX |
| CUTOFF DATE | XXXXX |
| PAYMENT DATE | XXXXX |
| ORDER NUMBER | XXXXX |

REGISTER — 143

FIG. 15

```
<?xml version="1.0" encoding="UTF-8"?>
<CorporationR>
<Image>SampleLtdInvoiceSheet.pdf</Image>
<Image_jshfilename>C:/folder/SampleLtdInvoiceSheet.pdf </Image_jshfilename>
<modifyDate>2018-06-12T09:36:02</modifyDate>
<processDate>2018-06-26T13:26:33</processDate>
<result>true</result>
<primarykey>-1</primarykey>
<2(※Total)>12,960</2>
<4(※InvoiceNumber)>A123BF4</4>
......
</CorporationR>
```

INFORMATION PROCESSING APPARATUS AND INFORMATION PROCESSING METHOD

CROSS-REFERENCE TO RELATED APPLICATION

This patent application is based on and claims priority pursuant to 35 U.S.C. § 119(a) to Japanese Patent Application Nos. 2018-137252 filed on Jul. 20, 2018, and 2019-105969 filed on Jun. 6, 2019, in the Japan Patent Office, the entire disclosure of which is hereby incorporated by reference herein.

BACKGROUND

Technical Field

The present invention relates to an information processing apparatus and an information processing method.

Description of the Related Art

According to an existing technique of recognizing a ledger sheet, reading of a target character string and recognition of attributes of the target character string are performed with ledger sheet definition, which registers the description position of the target character string in a ledger sheet image and the attributes of the target character string.

There is also a ledger sheet recognition technique applicable to a ledger sheet with a diverse or unknown layout, for example. Specifically, for example, the technique may previously define the item names of the items to be read, identify the item names based on the character strings recognized in the ledger sheet image, and extract the values of the items from character strings near the identified item names.

However, the layout of the ledger sheet is diverse, varying depending on the organization using the ledger sheet and the purpose of the ledger sheet, for example. Even with the above-described existing techniques, therefore, it is difficult in some cases to accurately recognize the item names in the ledger sheet and the relative positions of the item names and the values of the items.

SUMMARY

In one embodiment of this invention, there is provided an improved information processing apparatus that includes, for example, processing circuitry. The circuitry acquires first ledger sheet definition information and second ledger sheet definition information from a memory. The first ledger sheet definition information defines relative positions of an item and a value of the item in a ledger sheet. The second ledger sheet definition information defines relative positions of an item and a value of the item in a ledger sheet unique to a user. Based on at least one of the first ledger sheet definition information and the second ledger sheet definition information, the circuitry extracts an item and a value of the item from reading result information that associates a character string read from a ledger sheet image with information representing a position of the character string, and the circuitry outputs the extracted item and value of the item as a recognition result.

In one embodiment of this invention, there is provided an improved information processing method that includes, for example, acquiring first ledger sheet definition information and second ledger sheet definition information from a memory, extracting an item and a value of the item from reading result information based on at least one of the first ledger sheet definition information and the second ledger sheet definition information, and outputting the extracted item and value of the item as a recognition result. The first ledger sheet definition information defines relative positions of an item and a value of the item in a ledger sheet. The second ledger sheet definition information defines relative positions of an item and a value of the item in a ledger sheet unique to a user. The reading result information associates a character string read from a ledger sheet image with information of a position of the character string.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 3 is a diagram illustrating an example of a type determination database in the server of the embodiment;

FIG. 4 is a diagram illustrating types of ledger sheet definition information stored in a ledger sheet definition database in the server of the embodiment;

FIG. 5 is a diagram illustrating an example of general-purpose definition information of the embodiment;

FIG. 6 is a diagram illustrating an example of individual company definition information of the embodiment;

FIG. 7 is a diagram illustrating an example of specific definition information of the embodiment;

FIGS. 9A and 9B (FIG. 9) are a sequence diagram illustrating an operation of the ledger sheet recognition system of the embodiment;

FIG. 10 is a diagram illustrating an example of a job list of the embodiment;

FIG. 14 is a diagram illustrating an example of a recognition result check screen generated by a display screen generating unit of the server of the embodiment; and FIG. 15 is a diagram illustrating an example of recognition result data of the embodiment.

Figure 1:
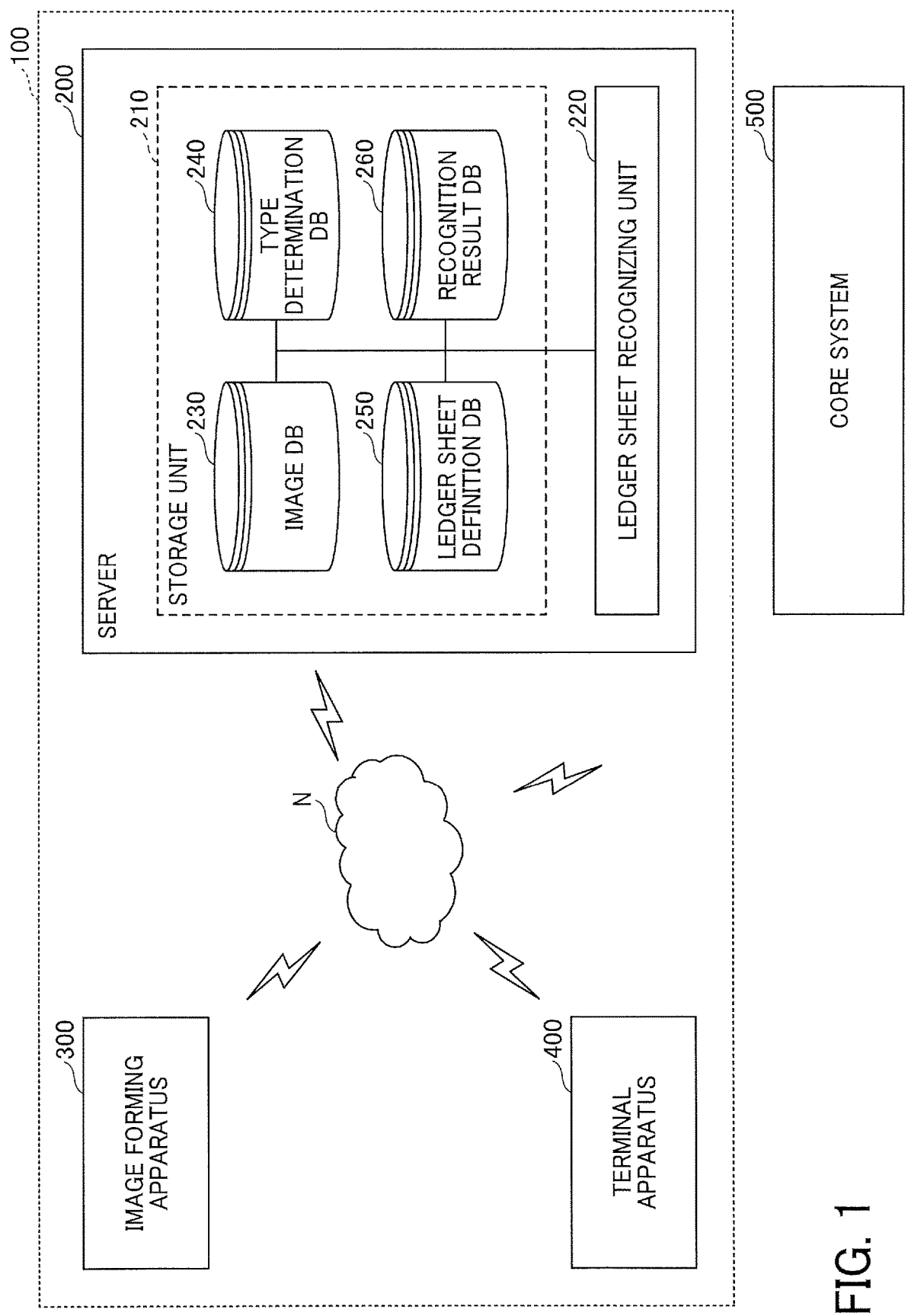
FIG. 1 is a diagram illustrating an example of the system configuration of a ledger sheet recognition system of an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment of the present invention will be described below with reference to the drawings.

FIG. 1 is a diagram illustrating an example of the system configuration of a ledger sheet recognition system of the embodiment. A ledger sheet recognition system 100 of the embodiment includes a server 200, an image forming apparatus 300, and a terminal apparatus 400. In the ledger sheet recognition system 100 of the embodiment, the server 200, the image forming apparatus 300, and the terminal apparatus 400 are connected via a network N.

The terminal apparatus 400 of the embodiment is also connected to a core system 500 via the network N, for example. The core system 500 performs a specific process with a result of recognizing a ledger sheet in the ledger sheet recognition system 100 of the embodiment, for example. Specifically, the core system 500 may be an accounting system or a quotation preparation system, for example.

In the ledger sheet recognition system 100 of the embodiment, the server 200 extracts items and the values of the items in a ledger sheet from image data of an image of the ledger sheet read by a scanner function of the image forming apparatus 300, and generates text data associating the items with the values of the items.

In the following description, the image of the ledger sheet read by the scanner function of the image forming apparatus 300 will be referred to as the ledger sheet image, and the image data of the ledger sheet image will be referred to as the ledger sheet image data.

Further, in the following description, extracting the items and the values of the items included in the ledger sheet image and converting the items and the values of the items into the text data associating the items with the values of the items will be referred to as ledger sheet recognition.

The server 200 of the embodiment includes a storage unit 210 and a ledger sheet recognizing unit 220. The storage unit 210 includes an image database (DB) 230, a type determination DB 240, a ledger sheet definition DB 250, and a recognition result DB 260.

The image DB 230 stores the ledger sheet image data. The type determination DB 240 stores information referred to to determine the type of the ledger sheet. The ledger sheet definition DB 250 stores ledger sheet definition information referred to in the ledger sheet recognition performed by the ledger sheet recognizing unit 220. The recognition result DB 260 stores information of a result of the ledger sheet recognition performed by the ledger sheet recognizing unit 220.

The ledger sheet recognizing unit 220 of the embodiment acquires the ledger sheet image data stored in the image DB 230, and refers to the type determination DB 240 to determine the type of the ledger sheet and identify the ledger sheet definition information to be referred to. The ledger sheet recognizing unit 220 then performs the ledger sheet recognition with the identified ledger sheet definition information in the ledger sheet definition DB 250, and stores a result of the ledger sheet recognition in the recognition result DB 260. The ledger sheet definition information includes information representing the description positions of item names included in the ledger sheet and information representing the relative positions of the item names and the values of the items.

In the ledger sheet recognition, the ledger sheet recognizing unit 220 of the embodiment refers to general-purpose definition information and individual company definition information stored in the ledger sheet definition DB 250.

In the embodiment, the general-purpose definition information is ledger sheet definition information that defines the layout of a typical ledger sheet, and the individual company definition information is ledger sheet definition information that defines the layout of a ledger sheet unique to a user of the ledger sheet recognition system 100. Details of the type determination DB 240 and the ledger sheet definition DB 250 will be described later.

The embodiment thus uses two types of ledger sheet definition information in the ledger sheet recognition to enable the recognition of a user-unique ledger sheet as well as the recognition of a general-purpose ledger sheet, thereby improving the accuracy of the ledger sheet recognition. In this disclosure, the general-purpose ledger sheet may be, for example, a ledger sheet commonly used by a plurality of different users (such as, companies).

In the ledger sheet recognition system 100 of the embodiment, the image forming apparatus 300 is a multifunction peripheral (MFP) having the scanner function. The image forming apparatus 300 is installed with applications for implementing functions such as the scanner function, a copier function, and a facsimile function. When the application corresponding to a desired one of these functions is selected, the desired function is implemented.

The terminal apparatus 400 of the embodiment is used by the user of the ledger sheet recognition system 100. The terminal apparatus 400 may display the result of ledger sheet recognition performed by the server 200.

In the embodiment, the user is a company or a firm, for example. More specifically, the user is a business establishment, a company, a firm, or an organization, for example, which has a contract to use a service provided by the ledger sheet recognition system 100.

In the example of FIG. 1, the server 200 includes four databases in the storage unit 210. The databases, however, are not limited to this configuration. The databases may be partially disposed outside the server 200, or all of the databases may be included in an external apparatus.

Further, in the example of FIG. 1, the ledger sheet recognizing unit 220 is implemented by the server 200. However, the ledger sheet recognizing unit 220 is not necessarily implemented thereby, and may be implemented by a plurality of information processing apparatuses.

Further, in the example of FIG. 1, the ledger sheet recognition system 100 includes one image forming apparatus 300 and one terminal apparatus 400. The ledger sheet recognition system 100, however, may include a desired number of image forming apparatuses 300 and a desired number of terminal apparatuses 400.

A hardware configuration of the server 200 of the embodiment will now be described with FIG. 2.

Figure 2:
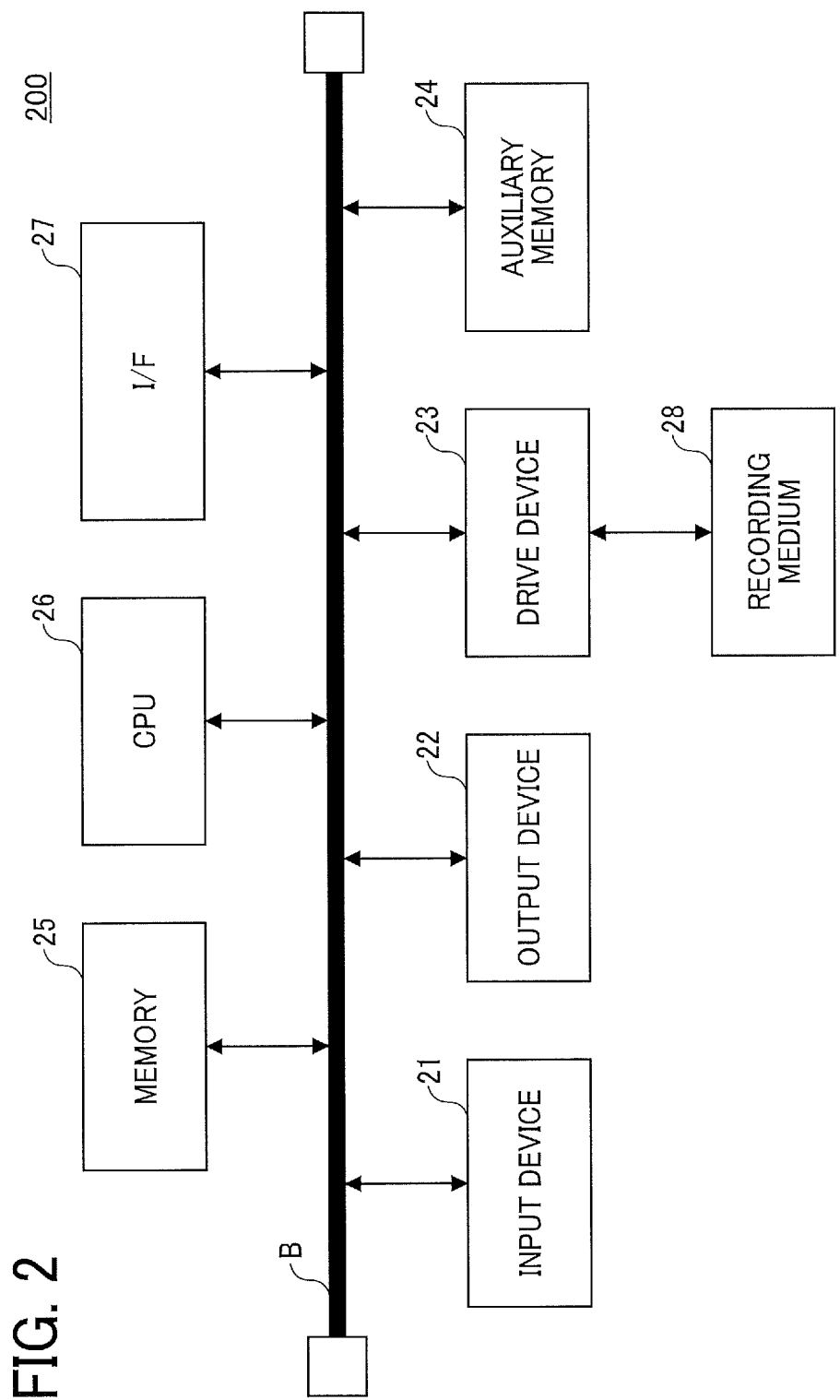
FIG. 2 is a diagram illustrating an example of the hardware configuration of a server forming the ledger sheet recognition system of the embodiment.

FIG. 2 is a diagram illustrating an example of the hardware configuration of the server 200 of the embodiment. The server 200 of the embodiment is an information processing apparatus including an input device 21, an output device 22, a drive device 23, an auxiliary memory 24, a memory 25, a central processing unit (CPU) 26, and an interface (I/F) 27, which are connected to each other via a bus B.

The input device 21 is used to input a variety of information, and may include a keyboard and a pointing device, for example. The output device 22 is used to output a variety of information, and may include a display, for example. The I/F 27 includes a local area network (LAN) card, for example, and is used to connect the server 200 to the network N.

An information processing program, which is at least a part of a variety of programs controlling the server 200, is provided as distributed in a recording medium 28 or as downloaded from the network N, for example. The recording medium 28 having the information processing program recorded thereon may include various types of storage media such as a storage medium on which information is optically, electrically, or magnetically recorded, such as a compact disc read only memory (CD-ROM), a flexible disc, or a magneto-optical disc, and a semiconductor memory on which information is electrically recorded, such as a ROM or a flash memory.

When the recording medium 28 having the information processing program recorded thereon is inserted in the drive device 23, the information processing program is installed in the auxiliary memory 24 from the recording medium 28 via the drive device 23. Alternatively, the information processing program may be downloaded from the network N and installed in the auxiliary memory 24 via the I/F 27.

The auxiliary memory 24 stores the installed information processing program, and also stores files and data to be used. The memory 25 stores the information processing program read from the auxiliary memory 24 at startup of the server 200. The CPU 26 implements later-described various processes in accordance with the information processing program stored in the memory 25.

The hardware configuration of the terminal apparatus 400 of the embodiment is similar to that of the server 200, and thus description thereof will be omitted. The terminal apparatus 400 may be a tablet terminal apparatus or a smartphone, for example. Further, the terminal apparatus 400 may include a display and operation device implemented by a touch panel, for example, in place of the input device 21 and the output device 22.

A description will now be given of the type determination DB 240 and the ledger sheet definition DB 250 included in the server 200 of the embodiment.

FIG. 3 is a diagram illustrating an example of the type determination DB 240 of the embodiment. The type determination DB 240 of the embodiment includes information items: "definition identification (ID)," "definition type," "document type," and "identification character string." In the type determination DB 240, the item "definition ID" is associated with the other items "definition type," "document type," and "identification character string." Information including the value of the item "definition ID" and the values of the other items "definition type," "document type," and "identification character string" will be referred to as the type determination information.

The value of the item "definition ID" is an identifier for identifying the ledger sheet definition information.

The value of the item "definition type" represents the type of the ledger sheet definition information. In the embodiment, the types of the ledger sheet definition information include specific definition information as well as the general-purpose definition information and the individual company definition information. The specific definition information is ledger sheet definition information that defines a specific ledger sheet issued by a specific business operator, for example. Specifically, the specific ledger sheet is a commonly used courier slip, for example.

The value of the item "document type" represents the type of the ledger sheet. Specifically, the types of the ledger sheet include invoice sheet, quotation sheet, and order sheet, for example. The value of the item "identification character string" represents the character string for identifying the type of the ledger sheet. Specifically, for example, when the ledger sheet image includes a character string "invoice sheet" or "invoice," the type of the ledger sheet represented by the item "document type" is "invoice sheet." Further, when the ledger sheet image includes two character strings "Corporation R" and "invoice," the type of the ledger sheet represented by the item "document type" is "invoice sheet for Corporation R."

For instance, in the example of FIG. 3, the type of the ledger sheet definition information corresponding to a definition ID "H01" is the general-purpose definition information. The general-purpose definition information corresponding to the definition ID "H01" defines the layout of "invoice sheet," and is referred to when the character string "invoice" or "invoice sheet" is extracted from the ledger sheet image data.

The ledger sheet definition DB 250 of the embodiment will now be described with FIGS. 4 to 7.

FIG. 4 is a diagram illustrating the types of the ledger sheet definition information stored in the ledger sheet definition DB 250 of the embodiment. The ledger sheet definition DB 250 of the embodiment stores general-purpose definition information 251, individual company definition information 252, and specific definition information 253.

The general-purpose definition information 251 of the embodiment is ledger sheet definition information of a ledger sheet having a highly generalized layout used by a plurality of users. The general-purpose definition information 251 has the lowest priority among the three types of ledger sheet definition information.

The individual company definition information 252 of the embodiment is ledger sheet definition information of a ledger sheet having a layout uniquely designed by a user, i.e., ledger sheet definition information dedicated to the user. The individual company definition information 252 has the highest priority among the three types of ledger sheet definition information in preference over the other two types of ledger sheet definition information.

The specific definition information 253 of the embodiment is ledger sheet definition information of a ledger sheet having a commonly used layout. The specific definition information 253 has an intermediate priority among the three types of ledger sheet definition information. For example, the specific ledger sheet is a ledger sheet that is commonly used by a plurality of different companies in the same industry. For instance, a commonly used layout may be previously determined by a group of users (companies). In contrary, the general-purpose ledger sheet is more widely used among different companies in different industries. That is, the degree of flexibility in changing such as items, or layout, differs between the general-purpose ledger sheet, the specific ledger sheet, and the user-unique ledger sheet.

The ledger sheet recognizing unit 220 of the embodiment recognizes the ledger sheet image data by referring to these three types of ledger sheet definition information. In the embodiment, therefore, if the layout of the ledger sheet in the ledger sheet image data is not defined by the individual company definition information 252 but is defined by the general-purpose definition information 251 or the specific definition information 253, for example, the ledger sheet recognizing unit 220 is capable of recognizing the ledger sheet image data.

FIG. 5 is a diagram illustrating an example of the general-purpose definition information 251 of the embodiment. The general-purpose definition information 251 is generated for each definition ID, and includes information items such as "item ID," "item name," "direction," and "distance." That is, the general-purpose definition information 251 of the embodiment has the item "definition ID" and the other items "item ID," "item name," "direction," and "distance" associated with the item "definition ID," and includes the value of the item "definition ID" and the values of the other items "item ID," "item name," "direction," and "distance."

The value of the item "item ID" is an identifier for identifying an item included in the ledger sheet. The value of the item "item name" represents the name of the item.

The items "direction" and "distance" represent the extraction range of the character string. For example, when the value of the item "direction" and the value of the item "distance" are RD and 20 mm, respectively, a character string is extracted from a range of 20 mm downward from the coordinates of the lower-right corner of a rectangle circumscribed on a character string representing the item name.

That is, the items "direction" and "distance" of the embodiment are conditions representing the extraction range of the character string, and these conditions are associated with the item name. The conditions representing the extraction range of the character string are the items "direction" and "distance" in the example of FIG. 5, but may include another item.

For example, therefore, a character string extracted from a range of 20 mm downward from the coordinates of the lower-right corner of a rectangle circumscribed on the character string of an item name "total sum" corresponding to an item ID "2" is recognized as the value of the item corresponding to the item name "total sum."

The general-purpose definition information 251 includes information of a plurality of items that may be included in the ledger sheet.

FIG. 6 is a diagram illustrating an example of the individual company definition information 252 of the embodiment. The individual company definition information 252 of the embodiment is registered for each user, and includes information items such as "user ID," "definition ID," "item name," "direction," and "distance." In this disclosure, the user may be a single user, or an organization to which a group of users belongs such as a division or a company.

The value of the item "user ID" is an identifier for identifying the user. In the embodiment, the items "definition ID," "item name," "direction," and "distance" of the individual company definition information 252 are similar to those of the general-purpose definition information 251, and thus description thereof will be omitted.

In the embodiment, when the definition type of the ledger sheet definition information is the individual company definition information, the definition ID of the ledger sheet definition information may include the user ID.

The user stores, in the individual company definition information 252, information of an item registering the item name and the conditions representing the range in which the value of the item is described. Therefore, an item ID included in the individual company definition information 252 may be one of the item IDs included in the general-purpose definition information 251.

The example of FIG. 6 illustrates the individual company definition information 252 registered by the user corresponding to a user ID "A." The definition ID and the document type of this individual company definition information 252 are "A01" and "invoice sheet for Corporation R," respectively.

FIG. 7 is a diagram illustrating an example of the specific definition information 253 of the embodiment. The specific definition information 253 of the embodiment is registered for each specific ledger sheet, and includes information items such as "definition ID, "item name," "direction," and "distance." In the embodiment, the information items "definition ID, "item name," "direction," and "distance" of the specific definition information 253 in FIG. 7 are similar to those of the general-purpose definition information 251 in FIG. 5, and thus description thereof will be omitted.

The specific definition information 253 of the embodiment may be set for each specific business operator. In this case, the specific definition information 253 may include "business operator ID" as an information item.

Functions of the server 200 of the embodiment will now be described with FIG. 8.

Figure 8:
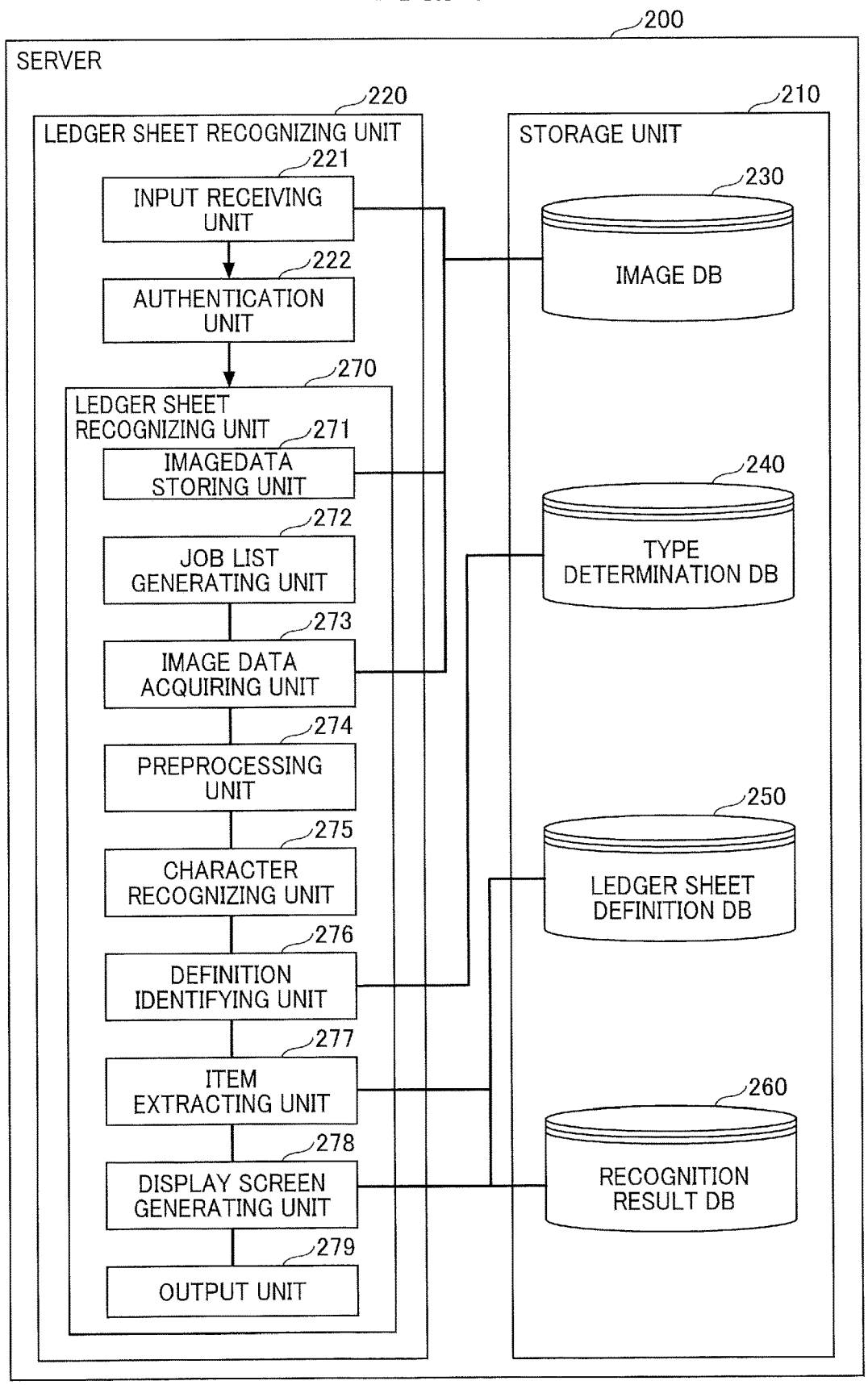
FIG. 8 is a diagram illustrating functions of the server of the embodiment.

FIG. 8 is a diagram illustrating functions of the server 200 of the embodiment. In the server 200 of the embodiment, the CPU 26 reads and executes the information processing program stored in the memory 25 or the auxiliary memory 24, for example, to thereby implement the functions of units described below.

In the server 200 of the embodiment, the ledger sheet recognizing unit 220 includes an input receiving unit 221, an authentication unit 222, and a ledger sheet recognizing unit 270.

The input receiving unit 221 receives a variety of inputs to the server 200. Specifically, the input receiving unit 221 receives input of authentication information for login to the ledger sheet recognition system 100. The authentication information includes a user ID and a password, for example. The input receiving unit 221 further receives input of the ledger sheet image data transmitted from the image forming apparatus 300, for example.

The authentication unit 222 performs authentication based on the authentication information input to the input receiving unit 221. For example, the authentication unit 222 may transmit the input authentication information to an authentication server disposed outside the server 200, and may acquire a result of authentication performed by the authentication server. If the user is authenticated, the authentication unit 222 may transfer the ledger sheet image data received by the input receiving unit 221 to the ledger sheet recognizing unit 270.

The ledger sheet recognizing unit 270 of the embodiment includes an image data storing unit 271, a job list generating unit 272, an image data acquiring unit 273, a preprocessing unit 274, a character recognizing unit 275, a definition identifying unit 276, an item extracting unit 277, a display screen generating unit 278, and an output unit 279.

In response to receipt of the ledger sheet image data from the image forming apparatus 300, the image data storing unit 271 stores the ledger sheet image data in the image DB 230.

When the input receiving unit 221 receives input of the ledger sheet image data from the image forming apparatus 300, the job list generating unit 272 registers a job in a job list, and manages the job list. Details of the job list will be described later.

The image data acquiring unit 273 acquires the ledger sheet image data stored in the image DB 230. The preprocessing unit 274 performs preprocessing for ledger sheet recognition on the ledger sheet image data acquired by the image data acquiring unit 273.

The character recognizing unit 275 extracts, from the ledger sheet image data, character strings and information of the disposition positions of the character strings, and holds the extracted character strings and information as recognition result information. Details of the recognition result information will be described later.

With reference to the type determination DB 240, the definition identifying unit 276 identifies the definition IDs corresponding to the character strings included in the recognition result information. In other words, the definition identifying unit 276 is implemented by processing circuitry that, based on the character strings extracted from the ledger sheet image data, identifies the ledger sheet definition information to be referred to in the ledger sheet recognition, and acquires the identified ledger sheet definition information from the ledger sheet definition DB 250.

Based on the ledger sheet definition information identified by the definition identifying unit 276 and the recognition result information, the item extracting unit 277 extracts items and the values of the items included in the ledger sheet image data, and associates the items with the values of the items, to thereby generate recognition result data associating the item IDs of the items with the values of the items. The item extracting unit 277 may generate a file in the extensible markup language (XML) format as the recognition result data. The item extracting unit 277 further extracts the description positions of the items in the ledger sheet and the relative positions of the items and the values of the items.

With the recognition result data stored in the recognition result DB 260, the display screen generating unit 278 generates a recognition result check screen. Each item name to be displayed on the recognition result check screen may previously be registered in association with the corresponding item ID. Then, when the recognition result check screen is generated, the item name corresponding to the item ID and included in the recognition result data may be identified and displayed on the recognition result check screen.

The output unit 279 outputs the recognition result check screen generated by the display screen generating unit 278. That is, the output unit 279 displays the recognition result check screen generated by the display screen generating unit 278 on a web browser running on the terminal apparatus 400.

With reference to FIG. 9, an operation of the ledger sheet recognition system 100 of the embodiment will be described below.

FIG. 9 is a sequence diagram illustrating an operation of the ledger sheet recognition system 100 of the embodiment.

In the ledger sheet recognition system 100, the image forming apparatus 300 receives a request from a user to launch an application for ledger sheet recognition (step S901), and launches the application (step S902).

The image forming apparatus 300 then receives input of the authentication information from the user (step S903), and transmits the authentication information to the server 200 and requests authentication (step S904).

In response to the authentication request, the server 200 performs the authentication with the authentication unit 222, and transmits a result of the authentication to the image forming apparatus 300 (step S905). The following processes are performed when the user is authenticated.

The image forming apparatus 300 then receives an instruction from the user to scan a ledger sheet (step S906), scans the ledger sheet, and acquires the ledger sheet image data (step S907). The image forming apparatus 300 then transmits the ledger sheet image data to the server 200 (step S908).

In the server 200, the input receiving unit 221 receives input of the ledger sheet image data, and the authentication unit 222 transfers the ledger sheet image data to the ledger sheet recognizing unit 270 (step S909). Although the ledger sheet image data is transferred to the ledger sheet recognizing unit 270 via the authentication unit 222 in the example of FIG. 9, the transfer of the ledger sheet image data to the ledger sheet recognizing unit 270 is not limited thereto. The ledger sheet image data may be transferred to the ledger sheet recognizing unit 270 without via the authentication unit 222.

In the ledger sheet recognizing unit 270 of the server 200, in response to receipt of the ledger sheet image data, the job list generating unit 272 registers a job in the job list (step S910), and the image data storing unit 271 stores the ledger sheet image data in the image DB 230 (step S911).

Then, the image data acquiring unit 273 of the ledger sheet recognizing unit 270 acquires the ledger sheet image data to be subjected to the ledger sheet recognition from the image DB 230 (step S912), and executes the process of recognizing the ledger sheet image (step S913). Details of the process of step S913 will be described later.

The ledger sheet recognizing unit 270 then stores the recognition result data generated by the item extracting unit 277 in the recognition result DB 260 (step S914).

In the ledger sheet recognition system 100, when the terminal apparatus 400 receives input of an instruction from the user to display the browser (step S915), the terminal apparatus 400 requests the server 200 to display the browser to display the recognition result data (step S916).

The terminal apparatus 400 further receives input of the authentication information from the user (step S917), and transmits the authentication information to the server 200 (step S918).

The server 200 performs the authentication of the user with the authentication unit 222 (step S919), and transmits a result of the authentication to the terminal apparatus 400 (step S920). The following processes are performed when the user is authenticated.

Then, the terminal apparatus 400 receives input of an instruction from the user to display the recognition result of the ledger sheet image (step S921), and requests the server 200 to display the recognition result of the ledger sheet image (step S922).

In response to the request to display the recognition result of the ledger sheet image, the server 200 acquires the recognition result data stored in the recognition result DB 260 (step S923), and generates and displays the recognition result check screen on the browser on the terminal apparatus 400 (step S924) to allow the user to check the recognition result on the displayed recognition result check screen. Then, the procedure is completed.

The job list generated by the job list generating unit 272 of the embodiment will be described with FIG. 10.

FIG. 10 is a diagram illustrating an example of the job list of the embodiment. In the server 200 of the embodiment, in response to receipt of input of the ledger sheet image data from the image forming apparatus 300, the job list generating unit 272 holds the ledger sheet image data and the job ID associated therewith as a job list.

A job list 101 of the embodiment includes information items: "job ID," "user ID," "ledger sheet image file path," "recognition result file path," "status," and "definition ID."

The value of the item "job ID" is an identifier for identifying the job, i.e., the ledger sheet image data received from the image forming apparatus 300.

The value of the item "user ID" is an identifier for identifying the user who has logged in to the ledger sheet recognition system 100.

The value of the item "ledger sheet image file path" is information of the location at which the ledger sheet image data is stored. The value of the item "recognition result file path" is information of the location at which the recognition result data resulting from the recognition of the ledger sheet image is stored.

The value of the item "status" represents the progress of the recognition of the ledger sheet image. The value of the item "definition ID" is the definition ID of the ledger sheet definition information to be referred to in the recognition of the ledger sheet image data stored at the location represented by the value of the item "ledger sheet image file path."

In the server 200 of the embodiment, in response to receipt of the ledger sheet image data from the image forming apparatus 300, the job list generating unit 272 adds a record to the job list 101 by assigning a job ID to the ledger sheet image data and associating the job ID with the user ID acquired as the authentication information. Then, when the ledger sheet image data is stored in the image DB 230, the job list generating unit 272 adds the information of the storage location of the ledger sheet image data to the job list 101 as the value of the item "ledger sheet image file path."

Further, when the ledger sheet definition information to be referred to in the recognition of the ledger sheet image is identified, the job list generating unit 272 adds the definition ID of the ledger sheet definition information to the job list 101 as the value of the item "definition ID." Then, when the recognition result data is stored in the recognition result DB 260, the job list generating unit 272 adds the information of the storage location of the recognition result data to the job list 101 as the value of the item "recognition result file path," and sets the value of the item "status" as "completed."

For example, the job list generated by the job list generating unit 272 may be displayed in the embodiment. In this case, the user is able to check the progress of the recognition of the ledger sheet image via a job list screen displayed based on the job list.

A process of the ledger sheet recognizing unit 270 of the embodiment will now be described with FIG. 11.

Figure 11A:
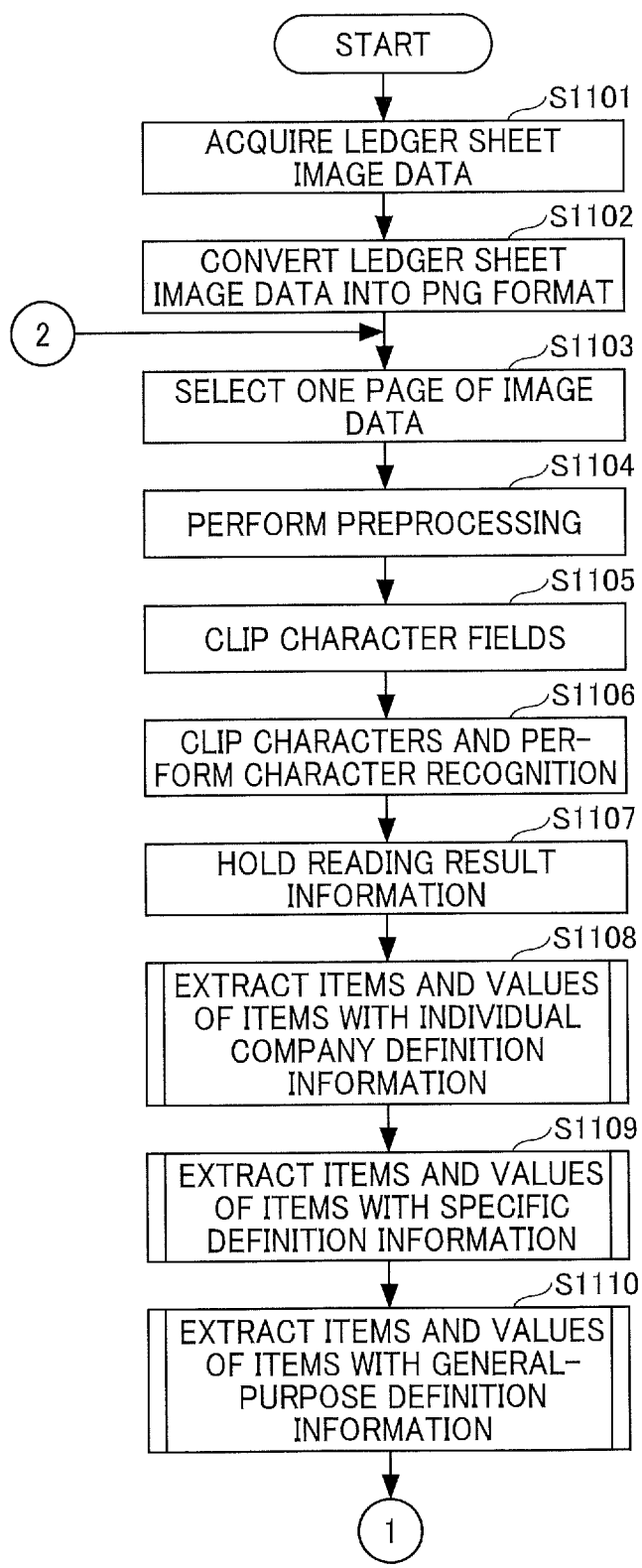
FIGS. 11A and 11B (FIG. 11) are a flowchart illustrating a process of a ledger sheet recognizing unit of the server of the embodiment.
Figure 11B:
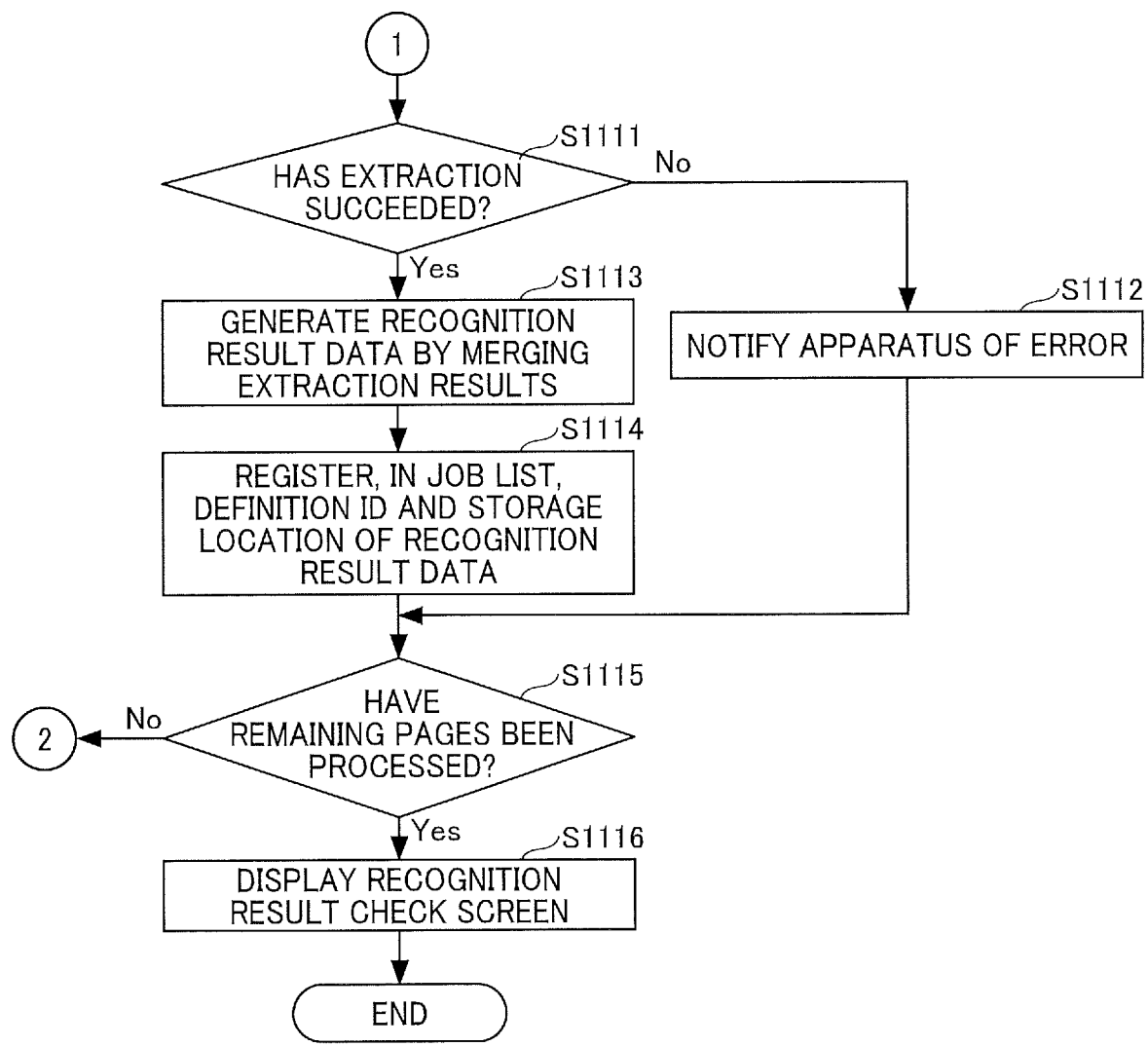

FIG. 11 is a flowchart illustrating a process of the ledger sheet recognizing unit 270 of the embodiment. FIG. 11 illustrates details of the process of step S913 in FIG. 9. It is assumed in the process of FIG. 11 that the ledger sheet image data received from the image forming apparatus 300 has a plurality of pages.

In the ledger sheet recognizing unit 270 of the embodiment, the image data acquiring unit 273 acquires the ledger sheet image data from the image DB 230 (step S1101), and the preprocessing unit 274 converts the format of the ledger sheet image data into the portable network graphics (PNG) format (step S1102). The preprocessing unit 274 then selects one page of the ledger sheet image data (step S1103), and performs preprocessing on the selected page of the ledger sheet image data (step S1104). Specifically, the preprocessing includes a correction process of aligning the orientation of ledger sheet images, for example.

Then, in the ledger sheet recognizing unit 270, the character recognizing unit 275 clips areas each having a character formed therein (hereinafter referred to as the character fields) from the ledger sheet image (step S1105). The character recognizing unit 275 then clips the characters in the clipped character fields, and performs character recognition on the clipped characters (step S1106). In this process, the character recognizing unit 275 also acquires coordinates representing the positions of the clipped characters.

Then, the ledger sheet recognizing unit 270 generates reading result information based on the relative positions of the characters recognized by the character recognizing unit 275, and holds the generated reading result information (step S1107). Specifically, based on the coordinates of the recognized characters, the ledger sheet recognizing unit 270 recognizes characters separated from each other by a distance equal to or less than a preset threshold value as one character string. Then, the ledger sheet recognizing unit 270 generates the reading result information by associating the character string with information such as the coordinates representing the position of the area in which the character string is formed. Details of the reading result information will be described later.

Then, in the ledger sheet recognizing unit 270, the item extracting unit 277 extracts the items and the values of the items by using the reading result information and the individual company definition information 252 identified based on the type determination DB 240 (step S1108).

Then, the item extracting unit 277 extracts the items and the values of the items by using the reading result information and the specific definition information 253 identified based on the type determination DB 240 (step S1109).

Then, the item extracting unit 277 extracts the items and the values of the items by using the reading result information and the general-purpose definition information 251 identified based on the type determination DB 240 (step S1110). Details of the processes of steps S1108 to step S1110 will be described later.

Then, the ledger sheet recognizing unit 270 determines whether the extraction of the items and the values of the items has succeeded (step S1111). Specifically, the ledger sheet recognizing unit 270 may determine that the items and the values of the items have been successfully extracted if the items and the values of the items extracted by the item extracting unit 277 are found during the time from step S1108 to step S1110.

If the ledger sheet recognizing unit 270 determines at step S1111 that the extraction of the items and the values of the items has failed (No at step S1111), the ledger sheet recognizing unit 270 notifies the terminal apparatus 400 or the image forming apparatus 300 of an error (step S1112), and proceeds to step S1115, which will be described later.

If the ledger sheet recognizing unit 270 determines at step S1111 that the extraction of the items and the values of the items has succeeded (Yes at step S1111), the item extracting unit 277 of the ledger sheet recognizing unit 270 generates the recognition result data by merging the extracted items and values of the items such that the items are associated with the values of the items (step S1113). Details of the merging process will be described later.

Then, the job list generating unit 272 of the ledger sheet recognizing unit 270 registers, in the job list 101, the definition ID of the ledger sheet definition information used to generate the recognition result data and the storage location of the recognition result data (step S1114).

Then, the ledger sheet recognizing unit 270 determines whether all of the remaining pages of the ledger sheet image data have been processed (step S1115). If the ledger sheet recognizing unit 270 determines at step S1115 that all of the remaining pages of the ledger sheet image data have not been processed (No at step S1115), the ledger sheet recognizing unit 270 returns to step S1103.

If the ledger sheet recognizing unit 270 determines at step S1115 that all of the remaining pages of the ledger sheet image data have been processed (Yes at step S1115), the display screen generating unit 278 of the ledger sheet recognizing unit 270 causes the terminal apparatus 400 to display the recognition result check screen generated with the recognition result data (step S1116). Thereby, the process is completed.

The above-described process example in FIG. 11 includes the display of the recognition result data. The display of the recognition result data, however, is not limited to this example. The ledger sheet recognizing unit 270 may display the recognition result data in response to receipt of a request from the terminal apparatus 400 to display the recognition result data.

A process of the item extracting unit 277 of the embodiment will now be described with FIG. 12.

Figure 12:
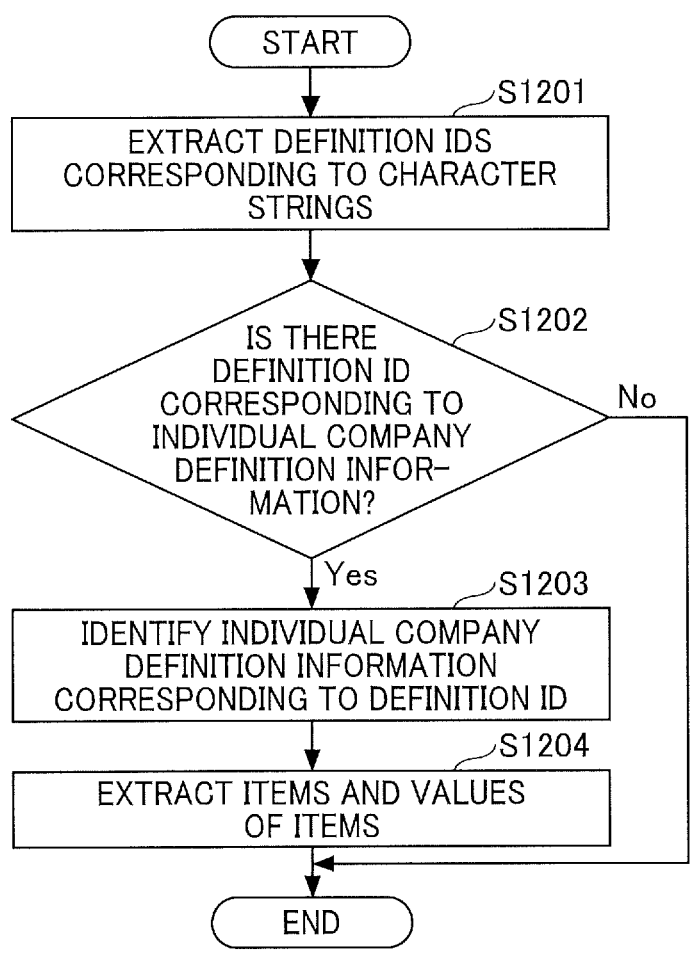
FIG. 12 is a flowchart illustrating a process of an item extracting unit of the server of the embodiment.

FIG. 12 is a flowchart illustrating a process of the item extracting unit 277 of the embodiment. FIG. 12 illustrates details of the process of step S1108 in FIG. 11.

In the ledger sheet recognizing unit 270 of the embodiment, when the reading result info illation is held, the definition identifying unit 276 extracts, from the type determination DB 240, the definition IDs corresponding to the identification character strings included in the reading result information (step S1201).

The definition identifying unit 276 then determines whether the extracted definition IDs include a definition ID corresponding to the individual company definition information 252 as the definition type (step S1202). That is, in this process, the definition identifying unit 276 determines whether the individual company definition information 252 is registered for the type of ledger sheet represented by the identification character strings included in the reading result information.

If the definition identifying unit 276 determines at step S1202 that the extracted definition IDs do not include the above-described definition ID (No at step S1202), the individual company definition information 252 defining the layout unique to the user is not registered for this type of ledger sheet. Therefore, the item extracting unit 277 completes the procedure, and proceeds to step S1109 in FIG. 11.

If the definition identifying unit 276 determines at step S1202 that the extracted definition IDs include the above-described definition ID (Yes at step S1202), the definition identifying unit 276 refers to the ledger sheet definition DB 250 and identifies the individual company definition information 252 including the definition ID (step S1203). When extracted definition IDs include the above-described definition ID, the ledger sheet has the layout unique to the user.

Then, based on the identified individual company definition information 252, the item extracting unit 277 extracts the items and the values of the items from the reading result information, and associates the items with the values of the items (step S1204).

The process at step S1109 of extracting the items and the values of the items by using the specific definition information 253 and the process at step S1110 of extracting the items and the values of the items by using the general-purpose definition information 251 are similar to the process at step S1108 of extracting the items and the values of the items by using the individual company definition information 252 except that the individual company definition information 252 at step S1108 is replaced by the specific definition information 253 or the general-purpose definition information 251. Thus, description of the processes of steps S1109 and S1110 will be omitted.

The generation of the reading result information of the embodiment will now be described.

Figure 13:
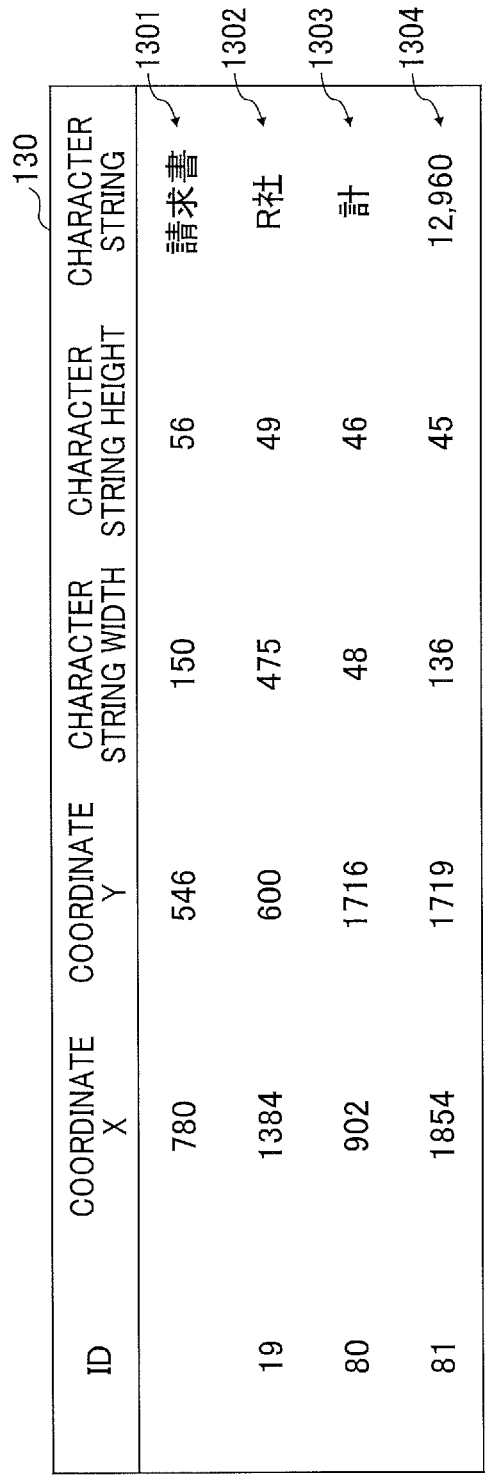
FIG. 13 is a diagram illustrating an example of reading result information of the embodiment.

FIG. 13 is a diagram illustrating an example of the reading result information of the embodiment. Reading result information 130 illustrated in FIG. 13 is extracted from a result of recognizing characters in character fields clipped from the ledger sheet image data of a certain invoice sheet and coordinates representing the positions of the characters, for example. The reading result information 130 includes character strings 1301 to 1304. The character strings 1301, 1302, and 1303 are translated as "invoice sheet," "Corporation R," and "total," respectively. Herein, the definition identifying unit 276 refers to the type determination DB 240, and extracts therefrom the definition IDs corresponding to the identification character strings matching the character strings included in the reading result information 130. In this case, the definition IDs "H01" and "A01" illustrated in FIG. 3 are extracted.

The definition identifying unit 276 then identifies, among the extracted definition IDs, the definition ID corresponding the individual company definition information 252 as the definition type. In this case, the definition ID "A01" is identified. That is, it is understood that the ledger sheet from which the reading result information 130 is extracted is set with the individual company definition information 252 corresponding to the definition ID "A01."

Then, the item extracting unit 277 refers to the individual company definition information 252 in the ledger sheet definition DB 250 corresponding to the definition ID "A01," as illustrated in FIG. 6.

According to the definition of the individual company definition information 252, the character string in the area under an item "total" corresponding to the item ID "2" and representing the billing amount is the value of an item name "total." Therefore, the item extracting unit 277 extracts the character string 1303 (i.e., "total") in the reading result information 130 as the item name "total," and extracts the character string 1304 (i.e., "12,960") in the area under the character string "total" as the value of the item name "total."

The item extracting unit 277 thus extracts, from the reading result information 130, the character strings corresponding to the item names defined in the individual company definition information 252 and the character strings representing the values of the items. After the item extracting unit 277 completes the extraction of the character strings corresponding to the item names defined in the individual company definition information 252 and the character strings representing the values of the items, the definition identifying unit 276 determines whether the extracted definition IDs include a definition ID corresponding to the specific definition information 253 as the definition type. In the present example, the extracted definition IDs do not include a definition ID corresponding to the specific definition information 253 as the definition type. That is, it is understood that the ledger sheet from which the reading result information 130 is extracted is not defined by the specific definition information 253.

The definition identifying unit 276 then determines whether the extracted definition IDs include a definition ID corresponding to the general-purpose definition information 251 as the definition type. In the present example, the definition ID "H01" is identified. That is, it is understood that the ledger sheet from which the reading result information 130 is extracted is also defined by the general-purpose definition information 251 corresponding to the definition ID "H01."

Then, the item extracting unit 277 refers to the general-purpose definition information 251 corresponding to the definition ID "H01" illustrated in FIG. 5, and extracts the character strings corresponding to the item names and the values of the items defined in the general-purpose definition information 251, similarly as in the extraction of character strings with reference to the individual company definition information 252.

The general-purpose definition information 251 defines all of the item names and the values of the items included in the ledger sheet of the document type "invoice sheet". With reference to the general-purpose definition information 251, therefore, the item names and the values of the items not defined by the individual company definition information 252 are extracted.

Further, unlike the definition of the individual company definition information 252, according to the definition of the general-purpose definition information 251, the character string in the area at the lower-right corner of the item "total sum" corresponding to the item ID "2" and representing the billing amount is the value of the item name "total sum." In the present example, the reading result information 130 does not include the character string "total sum," and thus the item extracting unit 277 determines that there is no value in the item corresponding to the item ID "2."

If the reading result information 130 includes the character string "total sum," the item extracting unit 277 extracts the character string "total sum" included in the reading result information 130 as the item name "total sum," and extracts the character string in the area at the lower-right corner of the character string "total sum" as the value of the item name "total sum."

In the embodiment, different types of ledger sheet definition information are thus referred to to extract the item names and the values of the items based on the respective types of ledger sheet definition information.

The merging process of the item extracting unit 277 will be described below.

If the item name and the value of the item corresponding to a certain item ID are extracted based on each of different types of ledger sheet definition information, the item extracting unit 277 of the embodiment employs the item name and the value of the item extracted based on the type of ledger sheet definition information having the highest priority to generate the recognition result data.

In the embodiment, the individual company definition information 252 is set with the highest priority among the general-purpose definition information 251, the individual company definition information 252, and the specific definition information 253. This is because the definition of the individual company definition information 252 is uniquely set by the user, and thus should be most preferentially referred to.

Further, in the embodiment, the specific definition information 253 is set with the second highest priority next to the individual company definition information 252, and the general-purpose definition information 251 is set with the lowest priority.

Therefore, if the item name and the value of the item corresponding to a certain item ID are extracted based on each of the three types of ledger sheet definition information, for example, the item name and the value of the item extracted based on the individual company definition information 252 are employed.

Specifically, for example, the general-purpose definition information 251 and the individual company definition information 252 both define the item corresponding to the item ID "2."

In the embodiment, therefore, the item name and the value of the item extracted based on the general-purpose definition information 251 and the item name and the value of the item extracted based on the individual company definition information 252 exist for the item corresponding to the item ID "2."

For the item corresponding to the item ID "2" in this case, the item extracting unit 277 uses the item name and the value of the item extracted based on the individual company definition information 252 to generate the recognition result data. Specifically, the item extracting unit 277 extracts the character string "12,960" as the value of the item based on the individual company definition information 252, and also determines that the value of the item is absent based on the general-purpose definition information 251. In this case, the item extracting unit 277 uses the character string "12,960" extracted based on the individual company definition information 252 of the higher priority to generate the recognition result data.

Since a typical invoice sheet uses "total sum" as the item name of the item representing the billing amount, the item "total sum" is set in the general-purpose definition information 251. Meanwhile, the invoice sheet to the user A from Corporation R uses not "total sum" but "total" as the item name. In this type of invoice sheet, therefore, the billing amount is not recognized if the general-purpose definition information 251 is referred to. To extract the billing amount from the invoice sheet to the user A from Corporation R, therefore, the individual company definition information 252 is used which is unique to the user A and set with the item "total."

Further, if the invoice sheet to the user A from Corporation R uses "total sum" as the item name of the item representing the billing amount, but if the position at which the value of the item is described is different from that in the typical invoice sheet, the values of items such as the direction and distance corresponding to the item name "total sum" in the individual company definition information 252 unique to the user A may be set to be different from those in the general-purpose definition information 251.

Further, the item corresponding to an item ID "10" defined in the general-purpose definition information 251 is not defined in the individual company definition information 252. For the item corresponding to the item ID "10," therefore, the item name and the value of the item are extracted based on the general-purpose definition information 251, and the item extracting unit 277 uses the item name and the value of the item extracted based on the general-purpose definition information 251 to generate the recognition result data.

As described above, in the embodiment, the plural types of ledger sheet definition information are set with different priorities. Among the item names and the values of the items extracted based on the respective types of ledger sheet definition information, the item names and the values of the items extracted based on the type of ledger sheet definition information having the highest priority are used to generate the recognition result data as the result of recognizing the ledger sheet image.

FIG. 14 is a diagram illustrating an example of the recognition result check screen generated by the display screen generating unit 278. FIG. 14 illustrates a screen 140 as an example of the screen displayed on the terminal apparatus 400. The screen 140 displays a recognition result generated as a result of recognizing the ledger sheet.

The screen 140 displays a ledger sheet image 141 read by the image forming apparatus 300 and information 142 in which the items and the values of the items extracted by the ledger sheet recognizing unit 270 are associated with each other. The screen 140 further displays a register button 143. The user refers to the ledger sheet image 141 to check the displayed items and values of the items, and if necessary, corrects the values of the items. If the user selects the register button 143, the corrected values of the items are registered as the recognition result data.

Further, in the embodiment, after the process of recognizing the ledger sheet image is completed for a certain job, the recognition result of the job may be displayed in a list. For example, in the embodiment, with reference to the recognition result data of the job, a job list may be displayed which includes the name of the invoice issuer company, the billing amount, the date of invoice, and the confirmation status indicating whether the recognition result has been confirmed by the user. Further, for the job with the recognition result confirmed by the user, the user ID of the user having confirmed the recognition result may be included in the job list at the position at which the recognition result data is registered. Further, when the job displayed in the list is selected, the recognition result check screen corresponding to the selected job may be displayed.

In the embodiment, image data of the ledger sheet image 141 and the information 142 may be stored in the core system 500 in response to selection of the register button 143, for example. Further, the user may download the registered recognition result data via the recognition result check screen and register the downloaded recognition result data in the core system 500 via an operation screen of the core system 500.

The screen 140 may further display information 144 representing the type of ledger sheet definition information referred to in the recognition of the ledger sheet image 141. In the embodiment, the thus-displayed information 144 notifies the user which type of ledger sheet definition information has been used to recognize the ledger sheet image 141.

An example of the recognition result data of the embodiment will be described below.

FIG. 15 is a diagram illustrating an example of the recognition result data of the embodiment. Recognition result data 151 illustrated in FIG. 15 describes, in the XML format, a result of extracting the items and the values of the items included in the ledger sheet image data, associating the items with the values of the items, and associating the item IDs of the items with the values of the items.

In the embodiment, when the recognition result data 151 is generated and stored in the recognition result DB 260, the storage location of the recognition result data 151 is set as the value of the item "recognition result file path" in the job list 101 illustrated in FIG. 10.

As described above, according to the embodiment, the items and the values of the items are extracted from the ledger sheet image with the plural types of ledger sheet definition information. Accordingly, the accuracy of the ledger sheet recognition is improved.

Further, the present invention may also be implemented as a recording medium storing a plurality of instructions which, when executed by one or more processors, cause the processors to perform an information processing method that includes acquiring first ledger sheet definition information and second ledger sheet definition information from a memory, extracting an item and a value of the item from reading result information based on at least one of the first ledger sheet definition information and the second ledger sheet definition information, and outputting the extracted item and value of the item as a recognition result. The first ledger sheet definition information defines relative positions of an item and a value of the item in a ledger sheet. The second ledger sheet definition information defines relative positions of an item and a value of the item in a ledger sheet unique to a user. The reading result information associates a character string read from a ledger sheet image with information of a position of the character string.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

As described above, there is provided an information processing apparatus that includes processing circuitry.

In one example, the circuitry acquires first ledger sheet definition information and second ledger sheet definition information from a memory. The first ledger sheet definition information defines relative positions of an item and a value of the item in a ledger sheet. The second ledger sheet definition information defines relative positions of an item and a value of the item in a ledger sheet unique to a user. Based on at least one of the first ledger sheet definition information and the second ledger sheet definition information, the circuitry extracts an item and a value of the item from reading result information that associates a character string read from a ledger sheet image with information representing a position of the character string, and the circuitry outputs the extracted item and value of the item as a recognition result.

In another example, the circuitry acquires first ledger sheet definition information and second ledger sheet definition information from a memory. The first ledger sheet definition information and the second ledger sheet definition information both define relative positions of an item and a value of the item in a ledger sheet, and are set with different priorities. Based on at least one of the first ledger sheet definition information and the second ledger sheet definition information, the circuitry extracts an item and a value of the item from reading result information that associates a character string read from a ledger sheet image with information representing a position of the character string. When the item and the value of the item are extracted based on each of the first ledger sheet definition information and the second ledger sheet definition information, the circuitry outputs, as a recognition result, the item and the value of the item extracted based on one of the first ledger sheet definition information and the second ledger sheet definition information higher in priority.

The invention claimed is:

1. An information processing apparatus comprising:
processing circuitry configured to
acquire first ledger sheet definition information and second ledger sheet definition information from a memory,
the first ledger sheet definition information being commonly used for multiple users and defining relative positions, in a ledger sheet image, of an item name and an item value of an item included in the ledger sheet image, and
the second ledger sheet definition information being unique to a user and defining relative positions, in the ledger sheet image, of the item name and the item value of the item included in the ledger sheet image,
perform optical character recognition on the ledger sheet image to obtain reading result information associating character strings read from the ledger sheet image with information representing positions of the character strings,
extract a character string corresponding to the item name of the item included in the ledger sheet image and a character string corresponding to the item value of the item from the reading result information based on at least one of the first ledger sheet definition information and the second ledger sheet definition information, and
output a recognition result in which the extracted character string corresponding to the item name of the item is associated with the extracted character string corresponding to the item value of the item.

2. The information processing apparatus of claim 1, wherein the second ledger sheet definition information is set with a priority higher than a priority of the first ledger sheet definition information, and
wherein when the character string corresponding to the item name and the character string corresponding to the item value are extracted based on each of the first ledger sheet definition information and the second ledger sheet definition information, the circuitry determines, as the recognition result, the character string corresponding to the item name and the character string corresponding to the item value that are extracted based on the second ledger sheet definition information.

3. The information processing apparatus of claim 2, wherein the circuitry further obtains, from the memory, third ledger sheet definition information defining relative positions of an item name and an item value of an item in a specific ledger sheet,
wherein the third ledger sheet definition information is set with a priority higher than the priority of the first ledger sheet definition information and lower than the priority of the second ledger sheet definition information, and
wherein the circuitry determines, as the recognition result, the character string corresponding to the item name and the character string corresponding to the item value that are extracted based on one of the first ledger sheet definition information, the second ledger sheet definition information, and the third ledger sheet definition information highest in priority.

4. The information processing apparatus of claim 1, wherein the circuitry generates screen data including the ledger sheet image and the extracted character strings corresponding to the item name and the item value of the item, and displays the generated screen data on a terminal apparatus as the recognition result.

5. The information processing apparatus of claim 4, wherein the generated screen data includes information identifying ledger sheet definition information used to extract the character strings corresponding to the item name and the item value of the item.

6. An information processing method comprising:
acquiring first ledger sheet definition information and second ledger sheet definition information from a memory,
the first ledger sheet definition information being commonly used for multiple users and defining relative positions, in a ledger sheet image, of an item name and an item value of an item included in the ledger sheet image, and
the second ledger sheet definition information being unique to a user and defining relative positions, in the ledger sheet image, of the item name and the item value of the item included in the ledger sheet image;
performing optical character recognition on the ledger sheet image to obtain reading result information associating character strings read from the ledger sheet image with information representing positions of the character strings;
extracting a character string corresponding to the item name of the item included in the ledger sheet image and a character string corresponding to the item value of the item from the reading result information based on at least one of the first ledger sheet definition information and the second ledger sheet definition information; and
outputting a recognition result in which the extracted character string corresponding to the item name of the item is associated with the extracted character string corresponding to the item value of the item.

* * * * *